March 15, 1960  B. F. McNAMEE  2,929,013
INVERTER CIRCUIT
Filed April 23, 1957
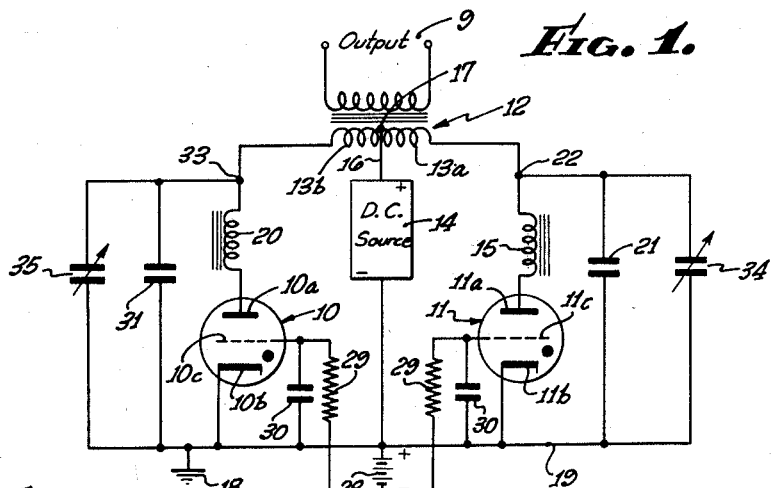
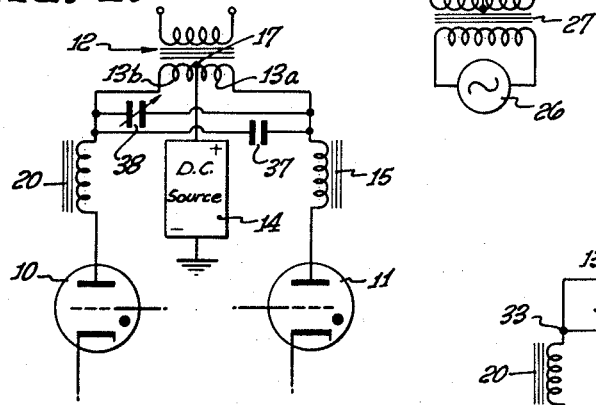
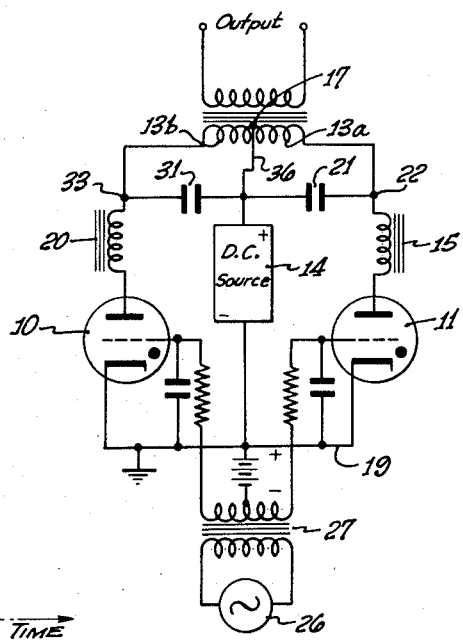
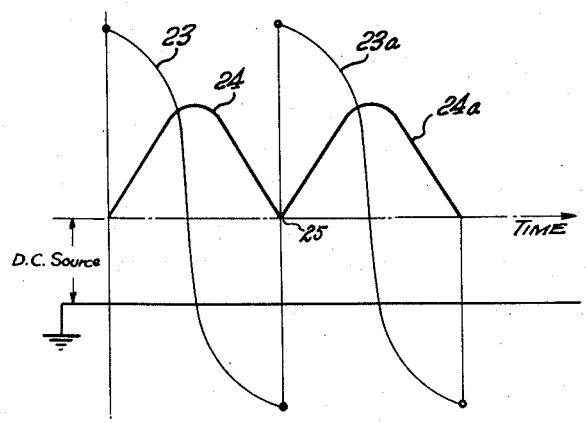
INVENTOR.
BERNARD F. McNAMEE,
BY
*Flam and Flam*
ATTORNEYS.

United States Patent Office 2,929,013
Patented Mar. 15, 1960

2,929,013

INVERTER CIRCUIT

Bernard F. McNamee, Altadena, Calif., assignor to Dressen-Barnes Corporation, Pasadena, Calif., a corporation of California Application April 23, 1957, Serial No. 654,598

9 Claims. (Cl. 321—35)

This invention relates to apparatus for providing alternating current from a direct current source, and particularly oscillators incorporating arc discharge tubes for providing substantial power, such oscillators being commonly known as inverters.

Electrical aircraft or missile equipment is often designed for operation at frequencies considerably higher than 60 cycles per second. Since there may be some frequency deviations of the generator source in airborne equipment, specifications often require certain performances throughout a frequency band. This necessitates extensive testing. In a manufacturing plant, a standard high frequency power source could be provided for use by various otherwise independent testing stations. But this would not permit local variations in frequency which is necessary for testing. Accordingly, one object of this invention is to provide a compact inverter for use by a single testing station. The frequency can, in a customary fashion, be varied over the test range without interference with other testing facilities.

Another object of this invention is to provide an inverter having substantially pure sine wave output and in which harmonic distortion is kept within one or two percent throughout all load conditions.

Another object of this invention is to provide an inverter circuit in which the commutation factor is quite low. This factor is defined as the product of the rate of current decay through the tube just prior to extinction and the rate of inverse voltage rise. A high commutation factor greatly shortens tube life and thus means substantial maintenance.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a wiring diagram illustrating an inverter circuit incorporating the present invention;

Fig. 2 is a graph illustrating the operating characteristics of the circuit; and Figs. 3 and 4 are wiring diagrams of other embodiments of the present invention.

The inverter circuit utilizes two grid-controlled arc discharge tubes or thyratrons 10 and 11 which are capable of carrying substantial currents. A transformer 12 couples the tubes 10 and 11 to the load 9.

One half 13a of the primary winding 13 of the transformer 12 is in series circuit relationship with a source of direct current potential 14, the tube 11 and an inductance 15. The circuit may be traced as follows: the D.C. source 14, connection 16, center tap 17 of the primary winding 13, the half 13a of this winding, inductance 15, the plate 11a of the tube 11, the cathode 11b thereof, to ground 18 or a common lead 19, to the other side of the source 14.

The opposite section 13b of the primary winding 13 is similarly in series circuit with the other tube 10. The circuit may be traced as follows: D.C. source 14, connection 16, center tap 17, half 13b of the primary winding 13, an inductance 20, plate 10a and cathode 10b of the tube 10, to ground 18 or the common connection 19, to the other side of the source 14.

A capacitor 21 parallels the tube 11 and the inductance 15 and forms therewith a closed tuned circuit. When the grid 11c of the tube 11 triggers the circuit and permits conduction, the capacitor 21 discharges through the inductance 15 and the tube 11. The closed tuned circuit starts to oscillate and the voltage at the point 22 diminishes sinusoidally, as illustrated by the plot 23 in Fig. 2.

The impedance of the tube in the conduction direction is quite small relative to the impedance values of the inductance 15 and the capacitor 21. A current pulse 24 (Fig. 2) passes through the tube 11. Due to the well known properties of oscillating circuits, this half cycle pulse of current has the form of a half sine wave. The pulse length is $\pi\sqrt{LC}$ seconds where L is the value of the inductance 15 and C is the value of the capacitor 21.

At the end of the first half-cycle of oscillation, the current tends to reverse. This is illustrated at the time corresponding to the point 25 in Fig. 2. The tube 11 of course conducts in only one direction and, accordingly, the oscillations are stopped at the end of one-half cycle.

During the next half-cycle, the source 14 passes current through the primary section 13a to recharge the capacitor 21. However, during the recharging period, the tube 11 is purposely prevented from conducting by virtue of the fact that the grid 11c of the tube during this interval is maintained at a value sufficient to prevent conduction. For this purpose, the grid 11c is controlled by an A.C. generator 26, which may be a small oscillator.

The grid 11c is fed from one branch of a center tapped secondary winding of transformer 27 driven by the generator 26. A grid bias battery 28 cooperates with the center tap of the transformer 27 and provides a reference value about which the voltage of the grid 11c swings. A resistor 29 limits grid current to a safe value and the capacitor 30 prevents stray induced voltages from influencing the grid 11c, all in a well known manner.

The grid 10c of the tube 10 is symmetrically connected to the secondary winding of transformer 27. Accordingly, the voltage of the grid 10c relative to the bias voltage determined by the battery 28 is 180° out of phase with the voltage of the grid 11c. Thus, when the grid 11c prevents conduction through the tube 11 during charging of the capacitor 21, the grid 10c permits conduction or triggers the tube 10. As the tube 10 conducts, current passes through the closed tuned circuit associated with the tube 10. Both closed tuned circuits have identical values.

A capacitor 31 parallels the tube 10 and the inductance 20 and discharges through the tube 10 in the same manner that the capacitor 21 discharges through the tube 11, but during the time that the capacitor 21 is charging. This is indicated by the voltage line 23a in Fig. 2 and the current line 24a. Symmetrically, the capacitor 31 charges while the capacitor 21 discharges through its corresponding tube 11.

The frequency of the control generator 26 corresponds to the natural frequency of each of the closed tuned circuits. The current pulse 24a through inductance 20, indicated in Fig. 2, thus begins at the time corresponding to the point 25, that is, at the time when the pulse 24 through the inductance 15 and tube 11 becomes equal to zero.

As the capacitor 21 discharges, as indicated by the plot 23 in Fig. 2, the point 22 swings from a high positive voltage to a negative voltage relative to the source 14. This determines a corresponding but opposite swing of the point 33. Hence, the capacitor 31 charges sinusoidally and the current through the branch 13b which sustains the load corresponds to a half sine wave pulse, the direction of current being from the center tap 17 to the point 33. Symmetrically, in the next half-cycle, the capacitor 21 charges sinusoidally and the current in the transformer part 13a which sustains the load is similarly a half sine wave form, the direction of current in this instance being from the center tap 17 to the point 22. So far as the output or secondary of the transformer 12 is concerned, the current follows a sine wave form since the physical directions of the current pulses are opposite.

Desirably the tuned circuits in which the tubes 10 and 11 are included have a natural frequency precisely that of the generator 26. If this relationship is maintained, there will be no distortion and the current pulses will be contiguous in time. However, the frequency relationships between the tuned circuits and the generator 26 are not critical. A slight discrepancy will result in simply a slight harmonic distortion.

At the point of commutation, that is, at the time 25 when the current tends to reverse through the tube, the tube current is reducing gradually since the current is a half sine wave pulse. Accordingly, the extent of ionization at the time immediately prior to commutation is small. Thus, when commutation occurs, there is little or no bombardment of tube parts. The circuit thus inherently provides a very small commutation factor. Tube life is accordingly very high. Maintenance of the tubes is virtually no problem.

By making the volt-amperes of the respective tuned loops relatively high, of the order of at least several times the volt-amperes of the maximum contemplated load, the load has relatively little effect upon the characteristics of the tuned circuits. Thus, the load may be zero, fairly large, leading or lagging and still there will be no significant distortion of wave form. Depending upon the relationship of the respective constants of the tuned circuits relative to the load, the load will have more or less effect in detuning the tuned circuits. Where a large variation in load is contemplated, it may be desirable to adjust the characteristics of the tuned circuits in order to correct for possible distortion. This is accomplished by utilizing trimming capacitors 34 and 35, which desirably are adjusted in unison.

In Fig. 3 there is illustrated a circuit that is substantially the equivalent of the circuit illustrated in Fig. 1. In the present instance, the capacitors 31 and 21 are connected between the points 33 and 22 to the center tap 17 instead of to the ground or common connection 19. Nonetheless, the capacitors 31 and 21 form tuned circuits with their respective inductances 15 and 20, providing the D.C. source 14 has relatively small impedance to alternating current. The tuned circuit for the tube 10 in this instance proceeds from the common connection 19, tube 10, inductance 15, capacitor 31, center tap 17, D.C. source 14, to the common connection 19.

In Fig. 3 the lead 36 can be deleted due to the symmetry of the circuit, without altering the basic operation. In this event, a single capacitor 37 can be substituted for the capacitors 31 and 21, having a capacitance equal to half that of either of the capacitors 31 or 21, but twice the voltage rating. This arrangement is illustrated in Fig. 4.

The capacitor 37 in Fig. 4, so far as the two branches are concerned, appears as a capacitor of half the size connected between the center tap 17 and either of the end taps. This may be understood from a consideration of the fact that the primary winding of the transformer 12 acts essentially as a one-to-two step-up autotransformer. In this case, as in the previous case, the A.C. impedance of the source must be low. A single trimming capacitor 38 may parallel the capacitor 37.

In all of the circuits, an unusually pure sine wave output is produced. Cut-off of each of the tubes does not depend upon the operation of the other tube. Accordingly, the current in each tube decays in sine wave fashion at a time when the other tube is non-conducting and a low commutation factor results. The effect of load is relatively insignificant in altering the sine wave form of the output. Also, the power factor of the load may be varied over a wide range, either leading or lagging without significant alteration of the sine wave form. From zero to full load for a particular application, the total harmonic distortion may be kept within one or two percent.

A characteristic of the present circuit which distinguishes it from circuits of known type is that there are two complementary circuit branches interconnected by a transformer winding. The ends of the transformer primary winding 13 are connected to points between the capacitors and inductances of each of the tuned circuits.

The inventor claims:

1. In an inverter system: a pair of circuits tunable to a desired frequency; each circuit including a unidirectional conducting member as well as a direct current source; means cyclically and consecutively rendering said members conductive at a rate corresponding substantially to the tuned frequency of the circuits to produce alternate half-cycle pulses in said tunable circuits; and a transformer having a primary and a secondary winding; the primary having sections respectively connecting the source to the circuits whereby one circuit is charged while the other is discharging; the secondary having terminals for connection to various loads.

2. In an inverter system: a pair of circuits tunable to a desired frequency; each circuit including an electronic emission device, each device having a control electrode, an anode and a cathode; each circuit also including a source of direct current between the anode and the cathode; means cyclically and consecutively biasing said control electrodes to cause the associated electronic emission device to become conductive, and at a rate corresponding substantially to the tuned frequency of the circuits, to produce alternate half-cycle pulses in said tunable circuits; and a transformer having a primary and a secondary winding; the primary having sections respectively connecting the source to the circuits whereby one circuit is charged while the other is discharging; the secondary having terminals for connection to various loads.

3. In an inverter system: a pair of grid controlled arc discharge tubes; means forming resonant circuit loops with the tubes and having capacitive and inductive components; a transformer winding having ends connected to the loops and having a central tap cooperable with a direct current source for charging the capacitive components of the circuit loops; and control means cooperable with the grids of the tubes for alternately triggering the tubes at a frequency corresponding substantially to the natural frequency of the circuit loops.

4. In an inverter system: a pair of grid controlled arc discharge tubes having cathodes and plates; a transformer winding; a pair of inductances respectively disposed between ends of the transformer winding and the plates of the tubes; a capacitor paralleling each tube and its inductance to form a tuned circuit loop; said transformer having a central tap cooperable with a direct current source for charging the capacitors through the winding; and control means for triggering the tubes at a frequency corresponding substantially to the natural frequency of circuit loops.

5. In an inverter system: a pair of grid controlled arc discharge tubes having cathodes and plates; a transformer winding having a center tap; a pair of inductances respectively disposed between the ends of the transformer winding and the plates of the tubes; a source of direct current connected to the tap; a capacitor shunting respective halves of the transformer winding and forming tuned circuit loops with the tubes and their corresponding inductances; and control means triggering the tubes at a frequency corresponding substantially to the natural frequency of the circuit loops.

6. In an inverter system: a pair of grid controlled arc discharge tubes having cathodes and plates; a transformer winding having a center tap; a pair of inductances respectively disposed between the ends of the transformer winding and the plates of the tubes; a source of direct current connected to the tap; a capacitor shunting the transformer winding and forming tuned circuit loops with the tubes and their corresponding inductances; and control means triggering the tubes at a frequency corresponding to the natural frequency of the circuit loops.

7. In an inverter circuit: a pair of unidirectionally conductive devices having control means for conditioning the conductivity thereof; means defining a pair of symmetrical closed circuit loops respectively including the devices; each loop including inductive and capacitive components whereby each loop is capable of half cycle circuitous discharge determined by the natural frequency of said components; a source of direct current; means alternately and repeatedly operating said control means and at a frequency corresponding substantially to said natural frequency; circuit means for charging one of the loops from said source when the corresponding device is non-conductive and in accordance with the discharge of the other loop; circuit means for charging the other of the loops from said source when the corresponding device is non-conductive and in accordance with the discharge of said one loop; and an A.C. load circuit external to the loop and energized by said charging currents.

8. The combination as set forth in claim 7 in which the circuit means for charging the loops respectively comprise legs of a transformer primary, and in which said load circuit is coupled to said primary by the aid of a transformer secondary.

9. The combination as set forth in claim 7 in which the volt amperes of said loops substantially exceed the volt amperes of said load circuit to maintain sinusoidal wave shape despite leading or lagging load characteristics, or variation in load.

References Cited in the file of this patent

UNITED STATES PATENTS

| | | |
|---|---|---|
| 2,179,366 | Willis | Nov. 7, 1939 |
| 2,443,100 | Edwards | June 8, 1948 |